US006043920A

United States Patent [19]
Leopold et al.

[11] Patent Number: 6,043,920
[45] Date of Patent: Mar. 28, 2000

[54] METHOD AND APPARATUS FOR LASER COMMUNICATION THROUGH A LOSSY MEDIUM

[75] Inventors: Raymond Joseph Leopold, Tempe; Kenneth Maynard Peterson, Phoenix; Keith Andrew Olds, Mesa, all of Ariz.

[73] Assignee: Motorola, Inc., Schaumburg, Ill.

[21] Appl. No.: 08/905,760

[22] Filed: Aug. 4, 1997

[51] Int. Cl.[7] ................................................ H04B 10/04
[52] U.S. Cl. ........................ 359/184; 359/181; 359/182; 359/189; 375/239
[58] Field of Search .................................. 359/172, 154, 359/152, 111, 173, 180, 184, 185, 186, 181–182; 375/239

[56] References Cited

U.S. PATENT DOCUMENTS

| | | | |
|---|---|---|---|
| 3,727,061 | 4/1973 | Dworkin | 250/199 |
| 4,214,807 | 7/1980 | Gfeller et al. | 350/3.73 |
| 4,399,564 | 8/1983 | Cowen | 359/173 |
| 4,656,439 | 4/1987 | Wessel | 332/7.51 |
| 4,764,982 | 8/1988 | Pfund | 359/152 |
| 5,038,406 | 8/1991 | Titterton et al. | 359/113 |
| 5,206,909 | 4/1993 | Gates | 380/59 |
| 5,586,714 | 12/1996 | Curicuta et al. | 228/122.1 |
| 5,689,519 | 11/1997 | Fermann et al. | 372/18 |
| 5,801,866 | 9/1998 | Chan et al. | 359/172 |

FOREIGN PATENT DOCUMENTS

| | | | |
|---|---|---|---|
| 0345361 | 12/1989 | European Pat. Off. | G01V 9/04 |
| 0560315 | 9/1993 | European Pat. Off. | H04B 10/10 |
| 9523461 | 8/1995 | WIPO | H04B 10/10 |

OTHER PUBLICATIONS

Yoo, et al., p. 427.
"Plane Waves In Unbounded, Isotropic Media", pp. 338–339, Chpt. V, Sec. 5.18.
"Terahertz Pulses Create Diffraction–Limited Images", Laser Focus World, Jul. 1995, p. 15.
"Fresnel Diffraction by Circular and Serrated Apertures Illuminated with an Ultrashort Pulsed–laser Beam", Journal of Optical Society of America, vol. 13, No. 4., pp. 771–778, Apr. 1996.
"Time–Resolved Fourier Spectrum and Imaging in Highly Scattering Media", Applied Optics, vol. 32, No. 26, pp. 5043–5048, Sep. 1993.
Combinatorial Pulse Position Modulation for Power–Efficient Free–Space Laser Communications, James M. Budinger, M. Vanderaar, P. Wanger and Steven Bibyk, NASA Technical Memorandum 106241, pp. 1–12, Jan. 1993.

*Primary Examiner*—Kinfe-Michael Negash
*Attorney, Agent, or Firm*—Sherry J. Whitney; Jennifer B. Wuamett

[57] ABSTRACT

A laser transmitter (200, 300) includes a femtosecond pulse forming circuit (214, 308) and an ultra high-speed optical switch (218, 304) which enable the transmitter (200, 300) to generate a modulated pulse stream having pulses with widths of under 200 femptoseconds. The transmitted pulse stream is processed by a laser detector (500), including a wideband optical detector (504) and pulse stretching circuit (506), that regenerates information included in the modulated pulse stream.

11 Claims, 4 Drawing Sheets

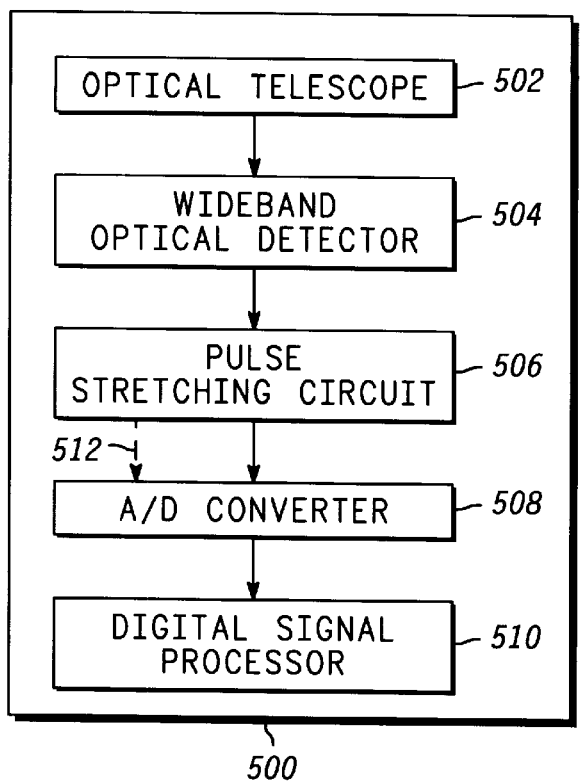
FIG. 5
FIG. 6
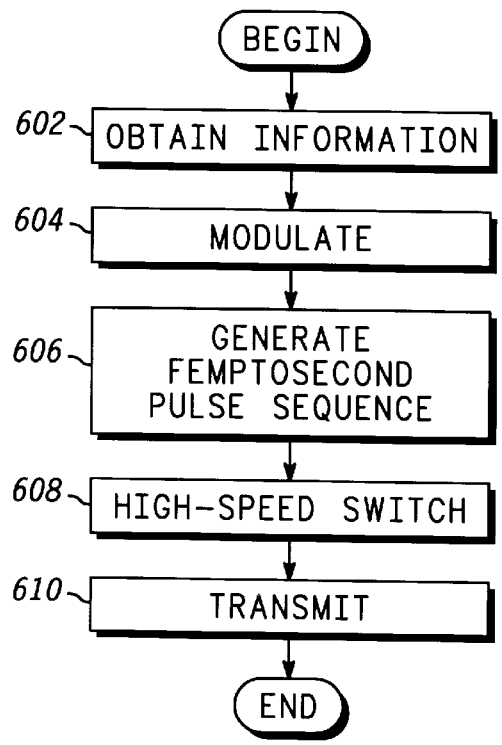

METHOD AND APPARATUS FOR LASER COMMUNICATION THROUGH A LOSSY MEDIUM

FIELD OF THE INVENTION

This invention relates generally to wireless communications and, more specifically, to wireless communications using laser signals.

BACKGROUND OF THE INVENTION

Wireless communications systems which provide communications through the Earth's atmosphere typically use radio-frequency (RF) communications technologies rather than optical technologies. The main reason is that optical signals become severely attenuated in the atmosphere due to absorption and scattering.

On the other hand, optical signals propagate well in environments which are substantially free of attenuating influences. For example, satellite communications systems are being developed which use laser cross-links between the satellites. The high bit rates attainable with optical communications and the minimal attenuation through free space makes laser communications desirable for such applications.

Both RF and optical communication links through the Earth's atmosphere suffer from attenuation. However, prior art systems have demonstrated that RF attenuation is manageable, even at relatively high bit-rates, by modifying signal transmission levels and modulation techniques. Prior-art optical technologies, on the other hand, have been unsuccessful at overcoming atmospheric attenuation, making high bit-rate optical communications through the atmosphere untenable.

Prior art systems have used optical communication signals at lower bit-rates for certain applications. For example, U.S. Pat. No. 5,038,406 discloses a two-way submarine communication system in which an airborne transceiver sends a down-link pulse-modulated laser signal to a submarine below the ocean's surface. The laser transmitter includes a fast-pulse rejection circuit which filters out pulses shorter than a minimum width (nominally 300 ns). This limits the ability to penetrate aerosols and obstructions because of the wide pulse width.

High frequency laser communications through lossy mediums has not been realizable because of attenuation of laser light in the atmosphere (scattering and absorption) has limited prior art technologies' ability to communicate short pulse width signals. Therefore, what is needed is a method and apparatus which provides short pulse width laser communications through a lossy medium while overcoming attenuation problems due to absorption and scattering.

BRIEF DESCRIPTION OF THE DRAWINGS

FIG. 5 illustrates a simplified block diagram of a laser detector in accordance with a preferred embodiment of the present invention;

FIG. 6 illustrates a flowchart of a method for generating a laser communications signal in accordance with a preferred embodiment of the present invention;

DETAILED DESCRIPTION OF THE DRAWINGS

The method and apparatus of the present invention overcomes attenuation problems due to absorption and scattering by generating laser communication signals having extremely narrow pulse widths. Modern laser technology has enabled the generation of narrow-width pulses and experiments are showing that these narrow-width pulses have characteristics which enable them to penetrate mediums with substantially less attenuation than was suffered by prior-art techniques.

The method and apparatus of the present invention applies the newly-discovered characteristics of these narrow pulse-width signals to the laser communications field. In accordance with a preferred embodiment, an extremely narrow-width, modulated laser pulse can be transmitted through a lossy medium without suffering significant attenuation. Thus, the method and apparatus of the present invention enables extremely high-rate communications through mediums which were previously considered too lossy to be conducive to high-rate laser communications. For example, the method and apparatus of the present invention could be used for laser communications through air, water, water vapor, solid obstructions, particulate suspension, glass fiber, and other mediums.

The method and apparatus of the present invention is particularly useful in a satellite communication system, where atmospheric and other obstructions block laser signals generated using prior-art methods. Satellite-to-ground and ground-to-satellite communications using very-short pulse laser communications in accordance with the method and apparatus of the present invention would result in substantially improved communications quality over prior-art methods. Additionally, the method and apparatus of the present invention could be used in ground-based communications systems and for inter-satellite or deep-space links. In the case of ground-based communications, the beneficial effects could be the greatest due to the heavy signal losses in the lower atmosphere.

Figure 1:
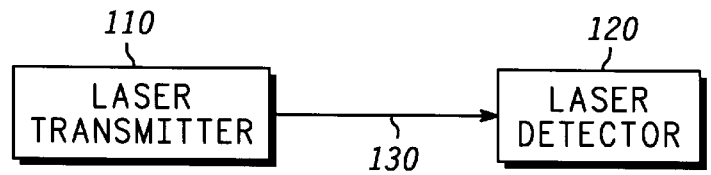
FIG. 1 illustrates a communication system in accordance with a preferred embodiment of the present invention.

FIG. 1 illustrates communication system 100 in accordance with a preferred embodiment of the present invention. In a preferred embodiment, communication system 100 includes laser transmitter 110 and laser detector 120. Laser transmitter 110 generates a laser signal in accordance with an embodiment of the present invention and transmits that laser signal to laser detector 120 over link 130. Link 130 can span a lossy medium such as, for example, those listed in the previous paragraph.

As will be discussed in detail below, the generated laser signal is a sequence of modulated optical pulses having pulse widths under 200 femtoseconds. The characteristics of the optical pulses having such narrow pulse widths are such that the pulses can travel through a lossy medium without suffering the same degree of attenuation as was suffered by prior-art systems. The method and apparatus of the present invention could also be used in systems using short pulses larger than 200 femtoseconds. In a preferred embodiment, pulse widths are in a range from 40 to 60 femtoseconds. In such systems, the beneficial effects of the method and apparatus would still exist, but would be reduced. After being received by laser detector 120, information contained within this signal is extracted as will be described in detail, below.

Figure 2:
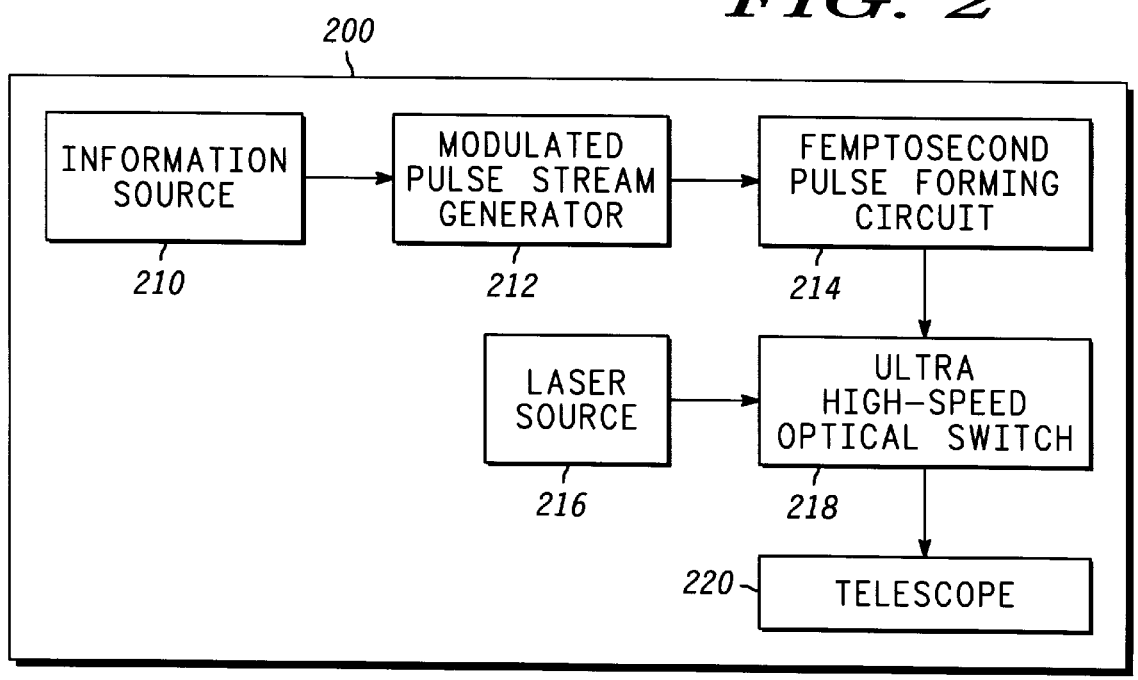
FIG. 2 illustrates a simplified block diagram of a laser transmitter in accordance with a preferred embodiment of the present invention.

FIG. 2 illustrates a simplified block diagram of a laser transmitter 200 in accordance with a preferred embodiment of the present invention. In a preferred embodiment, laser transmitter 200 includes information source 210, modulated pulse stream generator 212, femptosecond pulse forming circuit 214, ultra-high speed optical switch 218, laser source 216, and telescope 220.

Information source 210 could be any source of digital information or digitized analog information. This information could represent data from a single source, or could be composed of any number of multiplexed digital sources. For example, information source 210 could generate digital information which has been multiplexed using frequency-division multiple access (FDMA), time-division multiple access (TDMA), code-division multiple access (CDMA), other access techniques known to those of skill in the art, or any combination thereof.

Information source 210 provides the digital information or digitized analog information to modulated pulse stream generator 212 (MPSG). MPSG 212 generates a modulated pulse stream of relatively wide pulses. For example, the pulses would be similar to normal video pulses (e.g., carrier-less pulses) which could have pulse widths on the order of microseconds or nanoseconds. MPSG 212 could use various types of modulation or combinations of modulation techniques well known to those of skill in the art. For example, MPSG 212 could use pulse position modulation or frequency modulation.

In a preferred embodiment, the modulated pulse stream is provided to femptosecond pulse forming circuit 214 (FPFC). FPFC 214 forms an extremely short pulse, on the order of under 200 femptoseconds in width, each time FPFC 214 detects a specified edge of a pulse of the modulated pulse stream. In a preferred embodiment, FPFC 214 triggers on a rising edge, although FPFC 214 could alternatively trigger on a falling edge or both rising and falling edges. FPFC 214 could be, for example, a monostable multivibrator.

In an alternate embodiment, the functions of blocks 212 and 214 could be performed in a single step. In other words, extremely short pulses could directly be formed and modulated based on data provided by information source 210.

The output of FPFC 214 is provided to ultra high-speed optical switch 218 (UHSOS). UHSOS 218 receives the femptosecond pulses from FPFC 214 in addition to a substantially constant amplitude/frequency laser from laser source 216. Laser source 216 provides a laser having a wavelength which could be, for example, in the ranges of 810–850 nanometers or 1.05–1.5 micrometers, although those of skill in the art would appreciate that other wavelengths could be used.

Each time UHSOS 218 receives a femptosecond pulse from FPFC 214, UHSOS 218 switches laser source 216, thus creating a sequence of extremely short, modulated optical pulses. The sequence of optical pulses is provided to telescope 220, which directs the optical pulses toward a detector.

Figure 3:
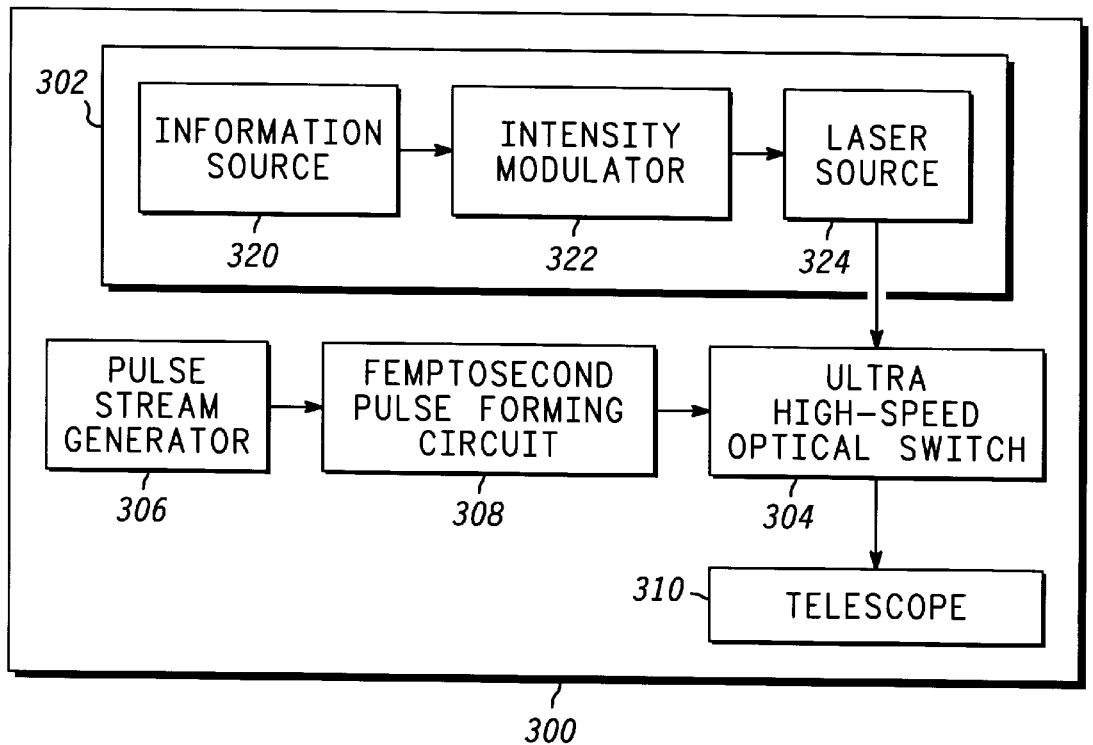
FIG. 3 illustrates a simplified block diagram of an amplitude modulation laser transmitter in accordance with a preferred embodiment of the present invention.

FIG. 3 illustrates a simplified block diagram of amplitude modulation (AM) laser transmitter 300 in accordance with a preferred embodiment of the present invention. In a preferred embodiment, AM laser transmitter 300 includes AM modulated pulse source 302, ultra-high speed optical switch 304, pulse stream generator 306, femptosecond pulse forming circuit 302, and telescope 310.

In a preferred embodiment, AM modulated pulse source 302 includes information source 320, intensity modulator 322, and laser 324. Information source 320 provides a waveform suitable for AM modulation. For example, information source 320 could provide a sequence of AM modulated pulses or an analog waveform. The information could be single-channel or multiplexed.

The AM waveform is provided to intensity modulator 322. Intensity modulator 322 modulates the intensity of a laser waveform generated by laser 324 by causing a drive characteristic of the laser source to change proportionally to the information. Intensity modulator 322 can modulate the laser light intensity by, for example, adjusting the amount of input bias current, changing voltages, or performing other modulation techniques well known to those of skill in the art. Laser 324 outputs a continuous laser signal which varies in intensity based on the information provided by information source 320.

Figure 4:
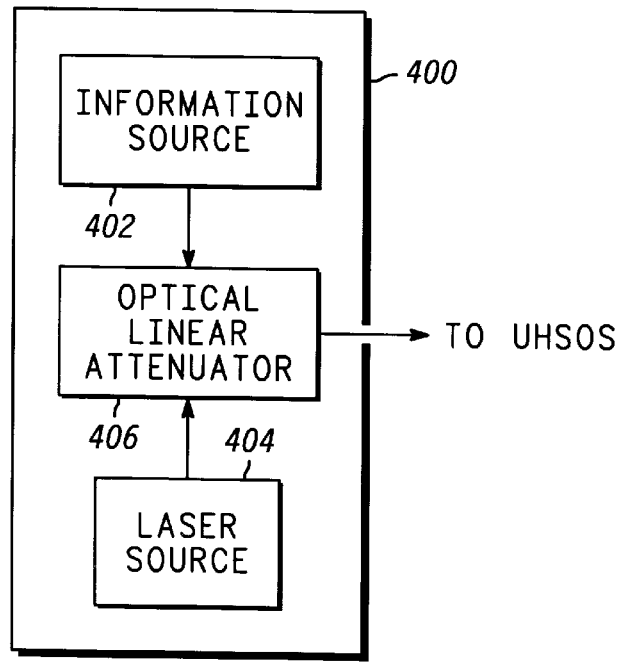
FIG. 4 illustrates a simplified block diagram of an AM modulated pulse source transmitter in accordance with an alternate embodiment of the present invention.

FIG. 4 illustrates a simplified block diagram of AM modulated pulse source 400 transmitter in accordance with an alternate embodiment of the present invention. AM pulse source 400 could be used, for example, as an alternative to AM modulated pulse source 302 shown in FIG. 3.

Contrary to AM modulated pulse source 302 (FIG. 3), AM modulated pulse source 400 uses a constant intensity laser 404 which is modulated by an optical linear attenuator 406. Optical linear attenuator 406, for example, can use liquid crystal technology to modulate the laser intensity. Optical linear attenuator 406 varies the intensity of the laser light in proportion to information provided by information source 402 (which is substantially similar to information source 320, described above). Optical linear attenuator 406 outputs a continuous laser signal which varies in intensity based on the information provided by information source 402.

Referring back to FIG. 3, the continuous laser signal (whether generated by AM modulated pulse source 302, 400, or other means) is input to ultra high-speed optical switch 304 (UHSOS). UHSOS 304 also receives a signal from pulse stream generator 306 and femptosecond pulse forming circuit 308 (FPFC).

Pulse stream generator 306 provides a substantially continuous pulse stream at a pulse rate which is higher than the bandwidth of the information provided by information source 320. This pulse stream is detected by FPFC 308, which forms an extremely short pulse, on the order of under 200 femptoseconds in width, each time FPFC 308 detects a specified edge of a pulse of the continuous pulse stream. In a preferred embodiment, FPFC 308 triggers on a rising edge, although FPFC 308 could alternatively trigger on a falling edge or both rising and falling edges.

The output of FPFC 308 is provided to UHSOS 304. UHSOS 304 receives the femptosecond pulses from FPFC 308 in addition to the intensity-modulated laser signal emanating from AM modulated pulse source 302 or 400. Each time UHSOS 304 receives a femptosecond pulse from FPFC 308, UHSOS 304 switches AM modulated pulse source 302 or 400, thus creating a sequence of extremely short, amplitude modulated optical pulses. The sequence of optical pulses is provided to telescope 220, which directs the optical pulses toward a detector.

Although the apparatus of the present invention has been described as using pulse position, amplitude, and frequency modulation techniques, other modulation techniques, such as phase modulation, could also be used while achieving the advantages of the method and apparatus of the present invention.

By employing FPFC 214, 308 and UHSOS 218, 304 to generate a modulated optical signal having an extremely narrow pulse width, the method and apparatus of the present invention enable high rate laser communications through a lossy medium from a transmitter 200, 300 to a detector such as that shown in FIG. 5.

FIG. 5 illustrates a simplified block diagram of laser detector 500 in accordance with a preferred embodiment of the present invention. In a preferred embodiment, laser detector 500 includes optical telescope 502, wideband optical detector 504, pulse stretching circuit 506, analog-to-digital (A/D) converter 508, and digital signal processor 510 (DSP).

Optical telescope 502 receives signals such as those generated by laser transmitters shown in FIGS. 2–4. These signals are provided to wideband optical detector 504, which converts the optical signals into a sequence of electrical pulses (e.g., carrier-less video pulses). These pulses will be substantially similar to the femtosecond pulses which were generated by UHSOS 218, 304 (FIGS. 2, 3). Wideband band optical detector 504 can include, for example, an avalanche photodiode.

Pulse stretching circuit 506 received the sequence of electrical pulses and stretches them to a width which is more conducive to demodulation (e.g., in the micro- or nano-seconds range). In essence, pulse stretching circuit 506 performs an inverse operation of FPFC 214, 308 (FIGS. 2, 3). Thus, the operation of pulse stretching circuit 506 is different depending on the modulation technique used in the transmitter.

For example, in a system employing a transmitter such as that shown in FIG. 2, in various embodiments, pulse stretching circuit 506 would generate a constant amplitude pulse whenever it was triggered by wideband optical detector 504. The constant amplitude pulse would desirably preserve the timing of the signal generated by the MPSG 212 (FIG. 2). In such an embodiment, pulse stretching circuit 506 could be a monostable multivibrator, for example.

In a system employing a transmitter such as that shown in FIGS. 3–4, pulse stretching circuit 506 could be a peak-detect-and-hold circuit. In one embodiment, a signal having the amplitude of each received pulse would be held until a pulse having a different level is received.

Regardless of the pulse stretching method used by pulse stretching circuit 506, the resulting signal is sampled by A/D converter 508. In a preferred embodiment, A/D converter 508 receives a trigger signal from pulse stretching circuit 506 on line 512 which indicates, to A/D converter 508, when to sample the pulse-stretched signal. In alternate embodiments, A/D converter 508 could receive the trigger signal from wideband optical detector 504, or use some other mechanism to determine sample timing.

A/D converter 508 must be configured to convert the signal using a technique which is consistent with the technique used to modulate the signal at the transmitter. A/D converter 508 provides the sampled signal to DSP 510, which demodulates the signal, resulting in substantially the originally transmitted information. DSP 510 processes the digital waveform in a manner consistent with the transmitter signal generation techniques.

Figure 7:
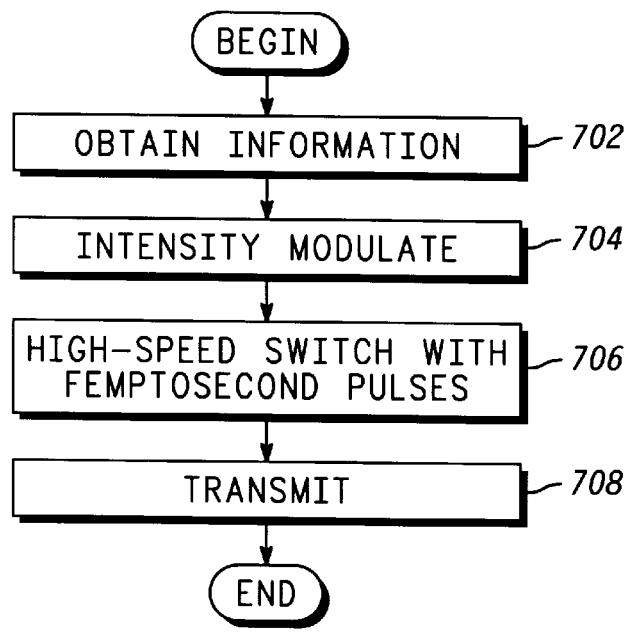
FIG. 7 illustrates a flowchart of a method for generating a laser communications signal in accordance with an alternate embodiment of the present invention.
Figure 8:
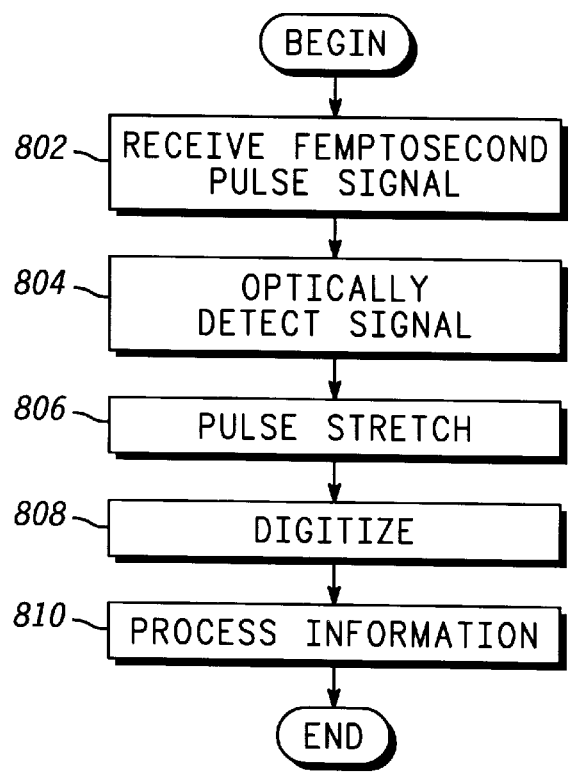
FIG. 8 illustrates a flowchart of a method for detecting a laser communications signal in accordance with a preferred embodiment of the present invention.

FIGS. 6–8 describe methods of carrying out embodiments of the present invention. FIG. 6 illustrates a flowchart of a method for generating a laser communications signal in accordance with a preferred embodiment of the present invention. The method begins, in step 602, by obtaining information to be transmitted. This information can be single channel or multiplexed information, for example. In step 604, the information is modulated, creating a modulated pulse stream of relatively wide pulses (e.g., carrier-less video pulses). Next, in step 606, specified edges of the pulses in the modulated pulse stream are detected in order to generate a sequence of extremely short pulses having pulse widths on the order of under 200 femtoseconds.

The pulse sequence is then switched with a laser source, in step 608 by an ultra high-speed optical switch, resulting in a sequence of extremely short, modulated optical pulses. The optical pulse sequence is then transmitted, in step 610, to a laser detector, and the method ends.

FIG. 7 illustrates a flowchart of a method for generating a laser communications signal in accordance with an alternate embodiment of the present invention. The method of FIG. 7 is particularly conducive to laser communications of AM modulated signals. The method begins, in step 602, by obtaining information to be transmitted. This information can be single channel or multiplexed information, for example. In step 604, the intensity of a laser is modulated to generate a laser signal which varies in intensity based on the information.

The intensity-modulated laser pulses are switched, in step 606, with a femtosecond pulse signal, resulting in a sequence of extremely short, amplitude modulated optical pulses. In step 608, the sequence of optical pulses is transmitted to a laser detector and the method ends.

FIG. 8 illustrates a flowchart of a method for detecting a laser communications signal in accordance with a preferred embodiment of the present invention. The method begins when an optical signal of femtosecond pulses is received in step 802. The pulses are optically detected, in step 804, resulting in a sequence of electrical pulses. The electrical pulses are then pulse stretched, in step 806, to a pulse width which is more conducive to modulation. The method of pulse stretching depends on the type of modulation technique used by the transmitter. In step 808, the resulting signal is digitized and processed, in step 810, to regenerate the information contained in the received signal. The method then ends.

In summary, the method and apparatus of the present invention generates an extremely narrow-width, modulated laser pulse which can be transmitted through a lossy medium without suffering significant attenuation. Thus, the method and apparatus of the present invention enables extremely high-rate communications through mediums which were previously considered too lossy to be conducive to high-rate laser communications.

The present invention has been described above with reference to preferred embodiments. However, those skilled in the art will recognize that changes and modifications may be made in these preferred embodiments without departing from the scope of the present invention. For example, the processes and stages identified herein may be categorized and organized differently than described herein while achieving equivalent results. These and other changes and modifications which are obvious to those skilled in the art are intended to be included within the scope of the present invention.

What is claimed is:

1. A method for communicating information over a wireless link through a lossy medium, the method comprising the steps of:

generating a modulated signal representing input data from at least one information source;

modulating a pulse stream with the information signal;

applying the modulated pulse stream to a laser to generate laser optical pulses wherein a pulse width of each pulse of the pulse stream is under 200 femtoseconds; and directing the laser optical pulses through the lossy medium toward a detector.

2. The method as claimed in claim 1, wherein the step of modulating a pulse stream comprises the step of:

pulse position modulating the pulse stream.

3. The method as claimed in claim 1, wherein the step of modulating a pulse stream comprises the step of:

amplitude modulating the pulse stream.

4. The method as claimed in claim 1, wherein the step of modulating a pulse stream comprises the step of:

frequency modulating the pulse stream.

5. The method as claimed in claim 1, wherein the step of modulating a pulse stream comprises the step of:

phase modulating the pulse stream.

6. The method as claimed in claim 1, wherein the step of modulating a pulse stream comprises the step of:

modulating the pulse stream using any combination of modulation methods in a group which includes pulse position modulation, amplitude modulation, frequency modulation, and phase modulation.

7. The method as claimed in claim 1, wherein the step of directing the laser optical pulses comprises the step of:

directing the laser optical pulses through a medium which includes any combination of matter in a group which includes air, water, water vapor, solid obstructions, particulate suspension, and glass fiber.

8. A method for communicating information over a wireless link through a lossy medium, the method comprising the steps of:

generating an information signal derived from at least one information source;

creating an intensity-modulated laser signal by modulating an intensity of a laser using the information signal;

generating a substantially fixed-rate pulse stream;

modulating the intensity-modulated laser signal with the pulse stream to generate laser optical pulses having widths of under 200 femtoseconds; and directing the laser optical pulses through the lossy medium toward a detector.

9. A laser transmitter comprising:

a modulated pulse stream generator which generates a pulse stream comprising a number of digital input data pulses which represent information to be communicated;

a pulse forming circuit, coupled to the pulse stream generator, which generates the pulse stream such that a pulse width of each pulse is under 200 femtoseconds for minimizing attenuation when the pulse stream is transmitted through a lossy medium;

a laser for generating a laser beam;

an optical switch, coupled to the pulse forming circuit and to the laser, which modulates the pulse stream with the laser to generate laser optical pulses; and an optical telescope, coupled to the optical switch, which directs the laser optical pulses over a wireless link through the lossy medium toward a detector.

10. A laser transmitter comprising:

a modulated pulse stream generator which generates a pulse stream comprising a number of digital input data pulses which represent information to be communicated;

an extremely short pulse forming circuit, coupled to a pulse stream generator, which generates a pulse stream such that a pulse width of each pulse yields minimal attenuation characteristics when the pulse stream is transmitted through a lossy medium; and an ultra high-speed optical switch, coupled to the pulse forming circuit and to a laser, which modulates the pulse stream with the laser to generate laser optical pulses which are transmitted by an optical telescope over a wireless link through the lossy medium.

11. A laser detector comprising:

an optical telescope for receiving laser optical pulses over a wireless communication link through a lossy medium, wherein the laser optical pulses include a modulated pulse stream which includes pulses having a pulse width of under 200 femtoseconds;

a wideband optical detector, coupled to the optical telescope, which detects the laser optical pulses and converts the optical pulses into electrical pulses;

a pulse-stretching circuit, coupled to the wideband optical detector, which stretches the electrical pulses into a stream of pulses having a width which is conducive to demodulation;

an analog-to-digital converter, coupled to the pulse-stretching circuit, for converting the analog signal into a digital pulse stream; and a processor, coupled to the analog-to-digital converter, for extracting information from the digital pulse stream.

* * * * *